United States Patent [19]

Tloczynski et al.

[11] 4,449,670

[45] May 22, 1984

[54] COMMINUTING APPARATUS WITH IMPROVED FEED SYSTEM

[75] Inventors: James J. Tloczynski, Parma; Clifford J. Ahola, Cleveland; Nicholas D. Rosenstein, Beachwood, all of Ohio; James C. Rine, Lake City, Fla.

[73] Assignee: The Goodyear Tire & Rubber Company, Akron, Ohio

[21] Appl. No.: 316,216

[22] Filed: Oct. 29, 1981

[51] Int. Cl.³ ............................................. B02C 7/12
[52] U.S. Cl. .................................. 241/35; 241/101 B; 241/257 R; 241/259.2; 241/259.3; 241/261.2; 241/DIG. 31
[58] Field of Search ............... 241/46 R, 46 B, 46.02, 241/464, 46.17, 244, 248, 257 R, DIG. 31, 259.2, 259.3, 101 B, 33–37, 62, 261.2

[56] References Cited

U.S. PATENT DOCUMENTS

| | | |
|---|---|---|
| 122,369 | 1/1872 | Deer . |
| D. 205,233 | 7/1966 | Brown .................... D37/1 |
| 205,557 | 7/1878 | Keim ..................... 241/296 |
| 856,918 | 6/1907 | Schreck . |
| 1,098,325 | 5/1914 | Kihlgren . |
| 1,286,865 | 12/1918 | Winegardner . |
| 1,435,130 | 11/1922 | Hogan . |
| 1,666,640 | 4/1928 | Cunniff . |
| 2,243,476 | 5/1941 | Hartmann ................ 83/7 |
| 2,296,564 | 9/1942 | Morehouse ............... 83/13 |
| 2,471,043 | 5/1949 | Schenck .................. 241/14 |
| 2,492,421 | 12/1949 | Golben ................ 241/101 B X |
| 2,513,752 | 7/1950 | Shaw ................... 308/134.1 |
| 2,654,295 | 10/1953 | Sutherland ............... 92/26 |
| 2,833,483 | 5/1958 | China .................... 241/37 |
| 2,876,958 | 3/1959 | Edwards et al. .......... 241/259.2 |
| 2,909,332 | 10/1959 | Brown et al. ............ 241/46 |
| 2,937,815 | 5/1960 | Eirich et al. ........... 241/257 |
| 2,980,353 | 4/1961 | Brown .................... 241/259 |
| 3,089,655 | 5/1963 | Heinz et al. ............ 241/260 |
| 3,135,499 | 6/1964 | Brown .................... 259/135 |
| 3,295,774 | 1/1967 | Fisher ................... 241/256 |
| 3,386,299 | 6/1968 | Brown et al. ............ 74/230.17 |
| 3,498,454 | 3/1970 | Timson ................... 209/144 |
| 3,675,674 | 7/1972 | Brown .................... 137/244 |
| 3,685,749 | 8/1972 | Brown .................... 241/65 |
| 3,847,359 | 11/1974 | Holmes et al. .......... 241/37 X |
| 3,948,449 | 4/1976 | Logan et al. ............ 241/41 |
| 3,954,025 | 5/1976 | Schnear .................. 74/611 |
| 3,960,331 | 6/1976 | Szkaradek ............... 241/43 |
| 3,961,757 | 6/1976 | Berggren ................ 241/37 X |
| 3,984,055 | 10/1976 | Szkaradek ............... 241/36 |
| 3,995,818 | 12/1976 | Skeen, Jr. .............. 241/46.11 |
| 4,039,153 | 8/1977 | Hoffman .................. 241/248 |
| 4,046,834 | 9/1977 | Lee et al. ............... 260/752 |
| 4,049,588 | 9/1977 | Lee et al. ............... 260/2.3 |
| 4,052,012 | 10/1977 | Feist ..................... 241/100 |
| 4,060,206 | 11/1977 | Granzow ................. 241/261.3 X |
| 4,062,599 | 12/1977 | Szkaradek ............... 308/1 |
| 4,082,234 | 4/1978 | Hoffman .................. 241/248 |
| 4,098,737 | 7/1978 | Lee et al. ............... 260/23.7 |
| 4,140,283 | 2/1979 | Szkaradek ............... 241/46.11 |

FOREIGN PATENT DOCUMENTS 2316289  10/1974  Fed. Rep. of Germany .
  61373  10/1926  Sweden .

OTHER PUBLICATIONS

The Carborundum Co. Drawings MS 62, 1/31/49; Drawings, DS 30577, 1/4/57; Drawings MS 102, 12/31/46; Drawings DS 18802; 1/17/56; Drawings DS 14571; 12/24/52; Drawings MS 88, 3/15/49; Drawings DS 11126, 5/17/51.

Primary Examiner—Mark Rosenbaum
Attorney, Agent, or Firm—T. P. Lewandowski

[57] ABSTRACT

A pellet feeder (A) feeds pellets of vulcanized rubber or other materials and water or another fluid at controlled rates into a mixing tank (30). An agitator (32) mixes the pellets and fluid into a slurry. The slurry is pumped from the mixing tank to a mill (C) by a pump (34). The mill has a receiving region (70) defined between a stator (48) and a rotor (68) for receiving the slurry. The stator and rotor define a peripheral grinding zone (72) around the slurry receiving region. An impeller (74) has vanes which extend from the upper surface of the rotor to an abrasive surface (82) of the stator such that the impeller vanes are ground at the same rate as the stator and rotor wear to maintain a fluid seal around the impeller blades. Fluid cylinders (50, 52) maintain a constant pressure between the stator and rotor. The stator has a plurality of recesses (86, 86′) which preferably have downstream extending relief areas (214). The rotor also has a plurality of recesses (104, 104′) which have tapered portions along a downstream edge, such as sloping relief areas (220), for wedging the pellets into the grinding zone.

The rotor and stator are made of a vitreous bonded stone having a median pore size of about 50 microns.

14 Claims, 22 Drawing Figures

COMMINUTING APPARATUS WITH IMPROVED FEED SYSTEM

BACKGROUND OF THE INVENTION

This application pertains to the art of particle comminuting and more particularly to one pass comminuting of centimeter sized pellets or particles to micron sized particulates. The invention is particularly applicable to comminuting vulcanized rubber and will be described with particular reference thereto. However, it is to be appreciated that the invention has other applications such as comminuting coal, thermoplastics, thermosetting plastics, woods, ceramics, glass, resins, and other materials.

To facilitate reprocessing of vulcanized rubber and other elastomeric materials for reuse, the materials are commonly reduced to micron sized particles. Heretofore, various methods and apparatus have been employed to reduce the elastomeric materials to micron size. However, the prior art apparatus have had certain drawbacks, particularly when used for commercial production. One method for producing small particulates has been to subject material to a cryogenic temperature. The embrittled material is ground by conventional grinding techniques. Commonly, the ground particles are large and must be refrozen and ground another time before they can be reused efficiently. Thus, this technique is expensive and finds great difficulty in producing particles in the lower micron range. Others have used abrasion devices for reducing the particle size of rubber and other elastomers. However, abrasion devices have relatively low particle yields. Further, abrasion devices have an inherent temperature increase that causes a hazard of the rubber combusting. Moveover, the elevated temperatures involved in prior art methods tend to degrade the material being processed.

Accordingly, it has been found desirable to provide an effective method and apparatus for comminuting of a vulcanized rubber and other elastomers to micron sized particles to facilitate reuse. The present invention provides an apparatus which although relatively simple in design and operation efficiently produces micron sized particles.

BRIEF DESCRIPTION OF THE INVENTION

In accordance with the invention, there is provided a comminuting apparatus including a hopper for holding pellets to be comminuted. Connected with the hopper is a pellet feeding means for feeding the pellets from the hopper into a mixing tank at a selectable rate. Associated with the mixing tank is a fluid feeding means for feeding fluid at a selectable rate. An agitating means is associated with the mixing tank for mixing the pellets and fluid into a slurry. A pumping means pumps the pellet and fluid slurry from the mixing tank to a receiving region. The receiving region is defined between central portions of a stator and a rotor. The stator and rotor have peripheral abrasive surfaces disposed around the receiving region for defining a grinding zone therebetween. A rotating means is connected with the rotor for rotating it relative to the stator.

BRIEF DESCRIPTION OF THE DRAWINGS

The invention may take form in various parts and arrangements of parts. The FIGURES are only for purposes of illustrating a preferred embodiment of the invention and are not to be construed as limiting the invention.

DETAILED DESCRIPTION OF THE PREFERRED EMBODIMENTS

Figure 1:
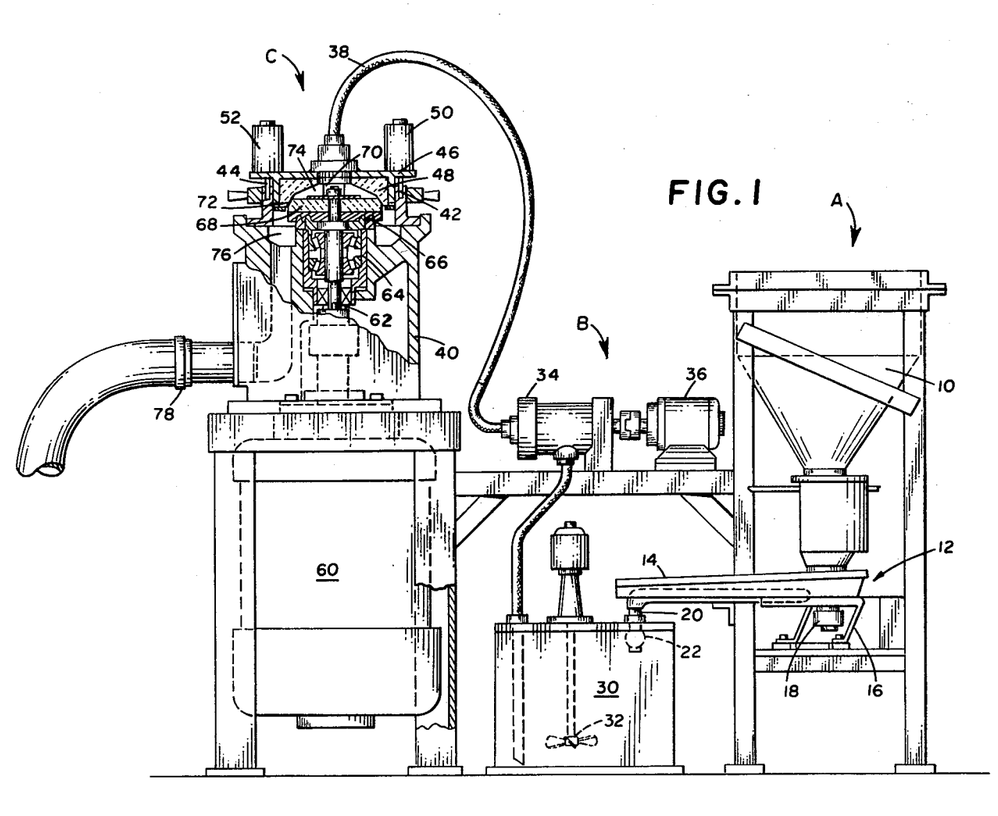
FIG. 1 is a side elevational view in partial section of a comminuting apparatus in accordance with the present invention.

With reference to FIG. 1, a feeding means A feeds fluid and pellets of the vulcanized rubber or other elastomer to be comminuted at coordinated rates. Preferably, the pellets are chunks which have a maximum cross sectional dimension on the order of a centimeter or less. The apparatus may be scaled up to handle larger pellets. A mixing means B receives the pellets and fluid and mixes them into a slurry. The slurry is fed to a mill C which grinds the pellets into micron sized particles, preferably with 90% of the particles by number having a diameter on the order of 20 microns or less.

The feeding means A includes a pellet feeding means for feeding pellets at a selectable rate and a fluid feeding means for feeding fluid commensurate with the rate that the slurry is fed to the mill. The pellet feeding means includes a hopper 10 which discharges the pellets into a vibratory feeder 12. The vibratory feeder includes a generally horizontal trough 14 which is mounted on springs 16 and vibrated by a motor 18. The vibratory feeder 12 moves the pellets at a rate controlled by the speed or duty cycle of the motor 18. Optionally, a plurality of vibratory feeders may be used. The fluid feeding means includes a water or other fluid inlet 20 and a level controlled valve 22.

The mixing means B includes a mixing tank 30 which receives pellets from the pellet feeding means and fluid from the fluid feeding means. An agitating means 32 mixes the pellets and fluid into a slurry. The slurry is pumped by a positive displacement pump 34 driven by a variable speed pump motor 36 from the mixing tank 30 through a feed line 38 to the mill C. The pump 34 is a progressing cavity positive displacement pump or other pump which supplies the slurry to the mill with a generally constant pressure. The fluid level in the mixing tank is maintained substantially constant by the fluid feeding means which adds fluid at the same rate that pump 34 pumps fluid from the tank. The slurry feed line 38 is of sufficiently small diameter that the slurry velocity maintains the pellets suspended in the slurry but not so small that the pump 34 or pump motor 36 are overloaded.

The mill C has a mill housing 40 upon which are mounted a plurality, four in the preferred embodiment, of upward extending posts, including posts 42 and 44. A stator mounting bracket 46 in which a stator 48 is mounted is slidably disposed on the posts for longitudinal, but not rotational, movement relative thereto. Connected between each of the posts and the stator mounting bracket 46 is a plurality of fluid cylinders, including cylinders 50 and 52 for urging the stator mounting bracket and stator relative to the mill housing with a preselected force or load. When comminuting vulcanized rubber between a stator and a 10 inch rotor, a load of 2000-10,000 pounds has been found to produce satisfactory results, 3850 pounds of load being preferred.

A rotor motor 60, such as a 100 horsepower motor, is mounted in a mill frame which is rigidly secured to the mill housing 40. The rotor motor 60 is coupled to a shaft 62 which is supported on the mill housing 40 by a thrust bearing 64. Mounted on the end of the mill shaft 62 is a rotor plate 66 for supporting a rotor 68.

A central portion of the rotor 68 and the stator 48 define a receiving region 70 for receiving the pellet and fluid slurry from the mixing means B. A peripheral region of the stator 46 and rotor 68 define a grinding zone 72 for comminuting the pellets into micron sized particles.

An impeller 74 is disposed in said receiving region 70 to facilitate movement of the pellets into the grinding zone 72. The particles and the fluid passing from the grinding zone 72 are collected in a trough 76 and pass through an outlet pipe 78. Downstream, not shown, the comminuted rubber particles and the fluid are separated.

Figure 1A:
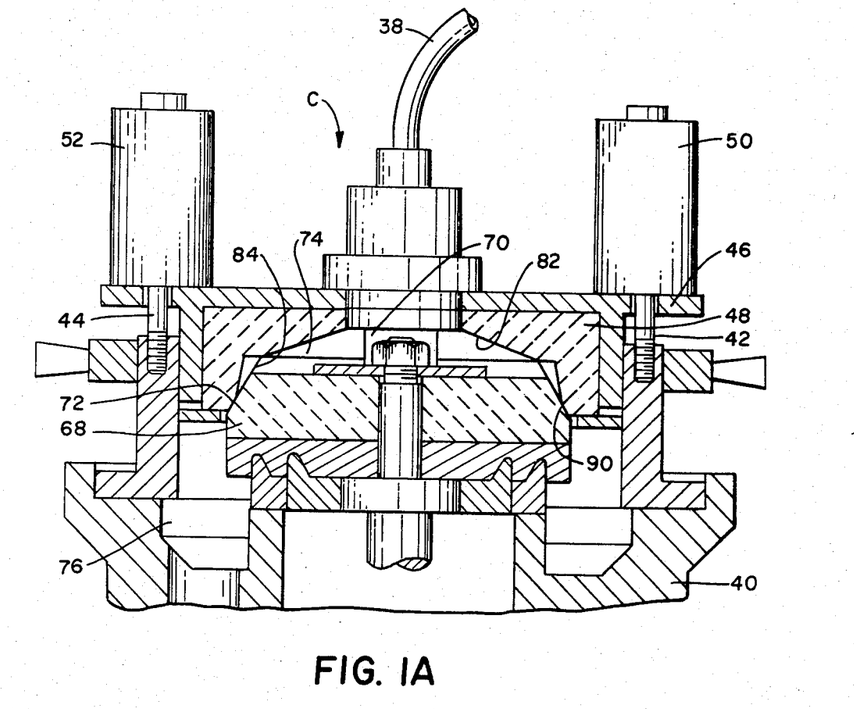
FIG. 1A is an enlarged view of the stator and rotor region of FIG. 1 with additional reference numerals.
Figure 2:
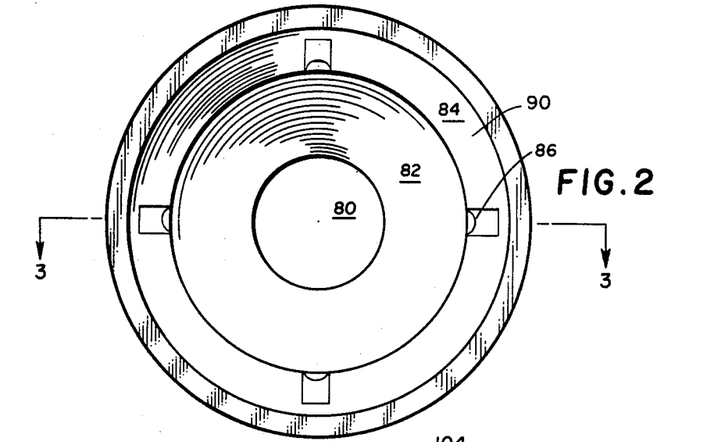
FIG. 2 is a bottom view of the face of the stator of FIG. 1.
Figure 3:
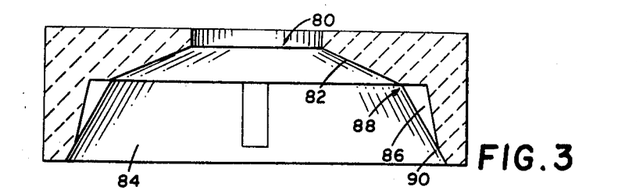
FIG. 3 is a sectional view through section 3—3 of the stator of FIG. 2.

With continuing reference to FIGS. 1 and 1A and further reference to FIGS. 2 and 3, the stator 48 is a unitary abrasive structure.

The stator 48 has a central, slurry receiving aperture 80 surrounded by a receiving region 70 (FIG. 1A) defined by a generally conical-shaped upper stator abrasive surface 82 and by a generally peripheral stator abrasive surface 84 which itself surrounds the receiving region 70.

The stator 48 has a plurality, four in the preferred embodiment, of stator recesses such as recess 86, which provide fluid communication between the slurry receiving region 70 (FIG. 1A) and the grinding zone 72 (FIG. 1A)

Each of the stator recesses, note stator recess 86, extends generally radially from a first or receiving region end 88 to a second or grinding zone end 90.

Figure 4:
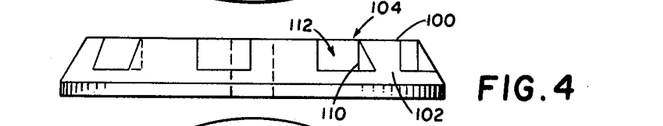
FIG. 4 is a side elevational view of the rotor taken along line 4—4 of FIG. 1.
Figure 5:
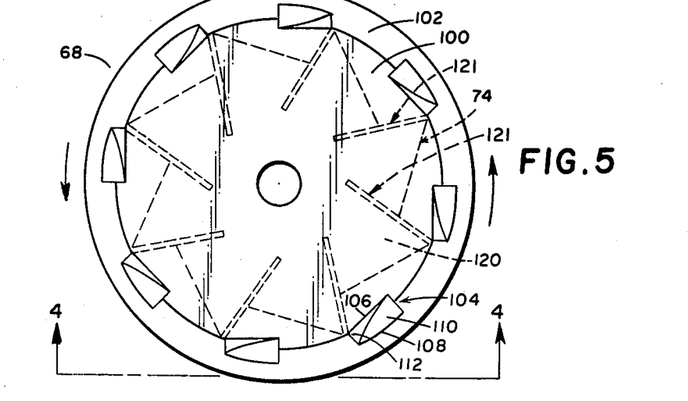
FIG. 5 is a top view of the rotor of FIG. 5 with the impeller in phantom.

With continued reference to FIGS. 1 and 1A and further reference to FIGS. 4 and 5, the rotor 68 is a unitary abrasive structure. The rotor has a central receiving region surface 100 for the lower portion of the central receiving region 70 (FIG. 1A), which supports the impeller 74, consisting of a base plate 120 and vertical vanes 121, and a peripheral generally conical-shaped abrasive surface 102 extending therearound. The stator and rotor peripheral abrasive surfaces 84 and 102 interact to define the grinding zone 72 (FIG. 1A) therebetween.

The rotor 68 has a plurality of recesses, eight in the preferred embodiment such as 104, which provide a path for the pellets between the slurry receiving region 70 (FIG. 1A) and the grinding zone 72 (FIG. 1A).

Each rotor recess, note rotor recess 104, has a receiving region end 106 and a grinding zone end 108. Further, each rotor recess has an upstream portion 110 in the direction of the rotation which is larger than the pellets and a trailing portion 112 which is smaller than the upstream portion. The trailing portion 112 wedges the pellets against the stator peripheral abrasive surface 84 and into the grinding zone 72 (FIG. 1A).

With reference to FIGS. 1 1A, 4 and 5, the impeller 74 is mounted on the rotor 68 for rotation therewith. The impeller 74 includes a base plate 120 which is mounted on the rotor receiving region surface 100 and a plurality of removably attached generally vertical vanes 121. Generally vertical is to connote that the vanes extend within the slurry receiving region 70 (FIG. 1A) and between the rotor receiving region surface 100 and stator receiving region abrasive surface 82 and impel the fluid and pellets toward the rotor recesses, such as recess 104. In the preferred embodiment, there are eight impeller vanes 121 each disposed adjacent the trailing edge of a corresponding one of the eight rotor recesses 104. Each vane 121 has a top or outward edge 122 which engages the stator receiving region abrasive surface 82. As the stator and rotor peripheral abrasive surfaces 84 and 102 wear, the stator receiving region abrasive surface 82 wears the outward impeller edge 122 at a corresponding rate. This maintains a fluid seal between the impeller vanes 121 and the stator receiving region surface 82 to improve the impelling action. The impeller tends to draw the slurry from the mixing means B (FIG. 1), changes the slurry flow from axial to radial, and impells the slurry with substantially even pressure into the grinding zone 72 (FIG. 1A).

As the rotor turns, the impelling action of the impeller 74 pumps the pellets and fluid into the rotor recesses 104, etc.. The centrifugal force from the rotation of the rotor recesses further urges the pellets and fluid through the rotor recesses. The highest pressure is developed at the outer or second end 108 of the rotor recesses. When a rotor recess 104 aligns with a stator recess 86, the stator recess 86 provides a path to the lower pressure in the receiving region 70. This pressure differential allows pellets and fluid to flow from the rotor recess 104 into the stator recess and back into the slurry receiving region 70. This creates a turbulence in the slurry receiving region 70 maintaining the pellets suspended in the fluid. Further, the pellets tend to be wedged into the grinding zone 72.

With reference to FIGS. 6A through 6I a view is taken of cutaway portions of upper stator 48 and lower rotor 68 shown for convenience as a horizontal view, as the rotor 68 rotates past the stator 49 from left to right. The view is taken in the direction from the stator grinding zone end 90 toward the stator abrasive surface 82 in the region of the stator peripheral abrasive surface 84.

Figure 6A:
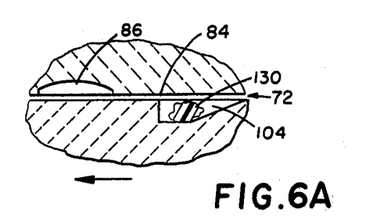
FIGS. 6A through 6I are enlarged cross sectional views of a pellet being received between the stator and rotor of a comminuting apparatus with progressive rotation of the rotor, the stator and rotor spacing being exaggerated for the ease of illustration.
Figure 6B:
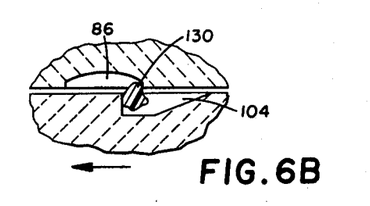
Figure 6C:
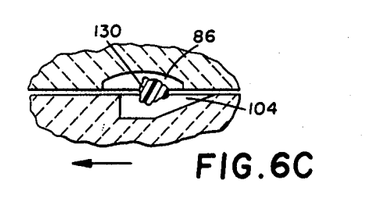
Figure 6D:
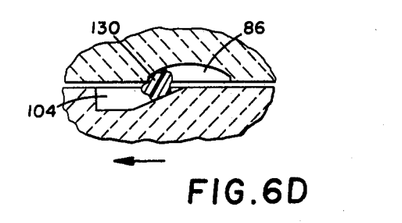
Figure 6E:
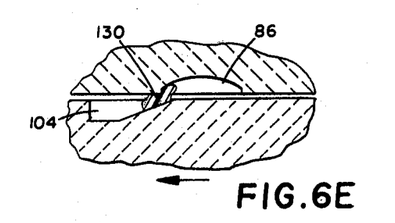
Figure 6F:
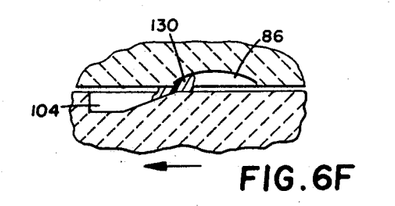
Figure 6G:
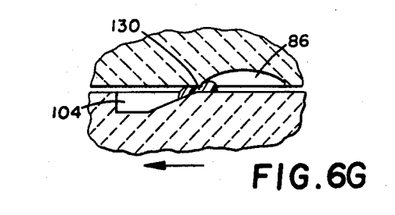

With reference to FIG. 6A, a pellet 130 is received in the rotor recess 104 and carried along the stator. When the rotor recess 104 aligns with the stator recess 86 (FIGS. 6B and 6C), the pellet tends to move toward the stator recess 86. Although some pellets may return to the receiving region 70 (FIG. 1A) through the stator recess, other pellets are caught between the recesses as they move out of alignment (FIGS. 6D and 6E). As the rotor and stator recesses move further out of alignment, the pellets are stretched and wedged into the grinding zone 72 (FIGS. 6F, 6G, and 6I). The pellet is stretched between the rotor and stator recesses 104 and 86 and peripheral abrasive surfaces 102 and 184 as the recesses 104 and 86 move apart.

Figure 6H:
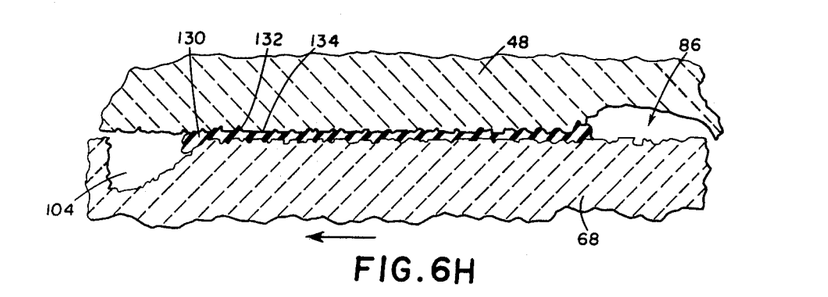
Figure 6I:
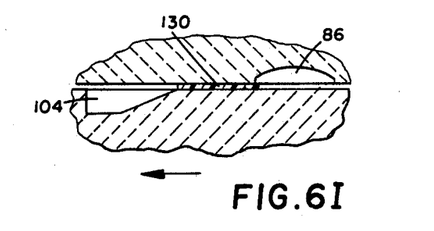

With particular reference to FIG. 6H, at least one and preferably both of the stator and rotor peripheral abrasive surfaces 84 and 102 have a plurality of pores, such as pore 132, which have a median pore size of about 10–200 microns. Between pores, the abrasive surfaces have substantially smooth regions 134. Although shown separated for ease of illustration, the smooth regions 134 of the stator and rotor slide generally along each other creating a shearing interaction. This cuts the vulcanized rubber of the pellets into smaller particles, generally on the order of the size of pores 132.

As the rotor continues to rotate (FIG. 6I), the rubber spirals outward from the rotor and stator recesses towards the edge of the rotor and stator peripheral abrasive surfaces 102 and 184. Along this path compression, rolling action, and continued interaction of the vulcanized rubber with the pores and flat surfaces comminutes the pellets into micron size particles.

The composition of the stator and rotor grinding surfaces 84 and 102 is such that the median pore size is 10–200 microns. A pore size of 50 microns has been found to be effective for comminuting vulcanized rubber to particles having by weight a median diameter of 50 microns and by number 90% of the particles having a diameter of less than 20 microns. In the preferred embodiment, the rotor and stator are constructed of silicon carbide with a grit size in the range of 36 to 60 mesh or aluminum oxide with a grit size in the range of 46 to 80 mesh. Other pore sizes may be used to obtain larger or smaller comminuted particles or when comminuting pellets of other materials. Preferably, these abrasives are vitreous bonded with about 22% glass by weight, although resin bonding and other bonding techniques may be used. These compositions have an interconnected porosity. To provide for a relatively long life, the rotor and stator are a P hardness or higher, the preferred embodiment being a T hardness, as commonly defined by the grinding wheel industry. Generally, the grits will not have the smooth surfaces 134 as the stones are manufactured. To achieve these flat surfaces, the stones are lapped together to wear sharper naturally occurring edges flat. The stator and rotor recesses may be cut or molded into the stone composition.

Figure 7:
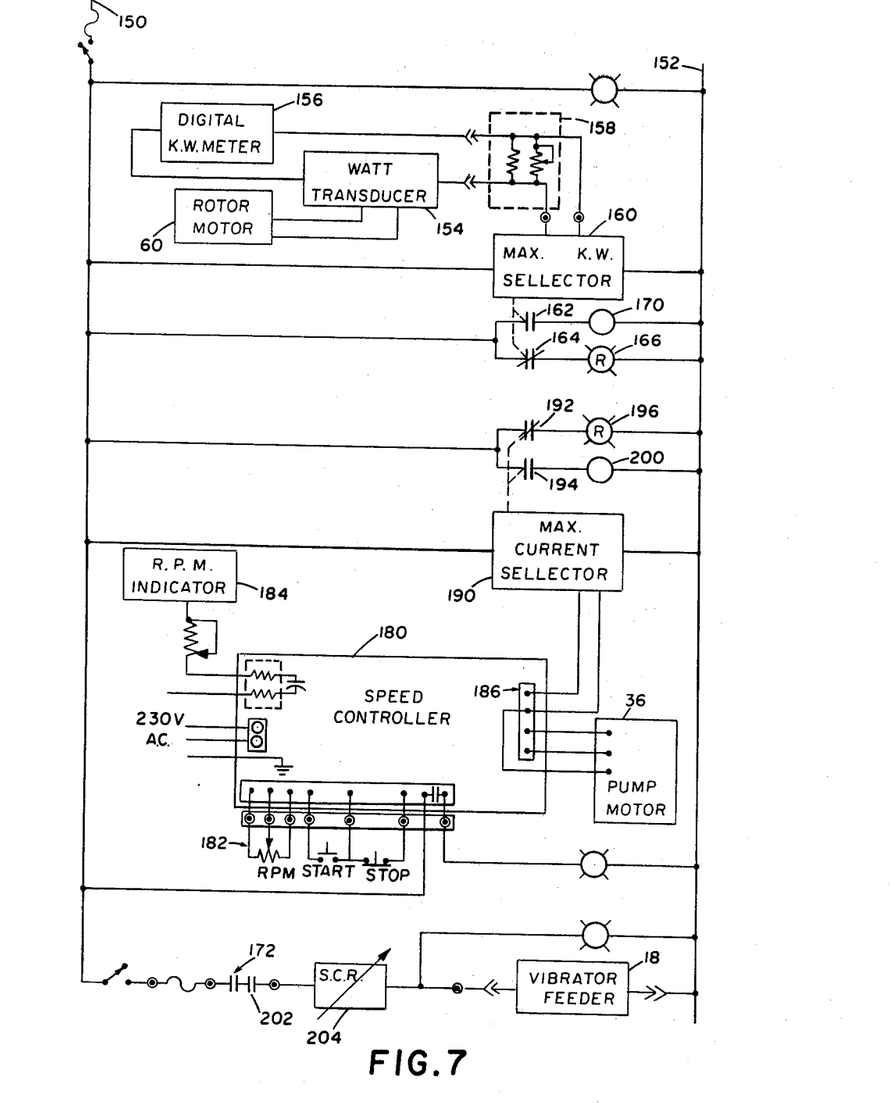
FIG. 7 is a schematic diagram of an electric control circuit for the comminuting apparatus in accordance with the present invention.

With reference to FIG. 7, an electric control circuit is provided to maintain the concentration of pellets in the grinding zone within a range which produces satisfactory results.

Briefly stated, the control circuit adjusts the feed rate of pellets into the mixing tank to maintain the power drawn by the rotor motor 60 substantially constant. The control increases the pellet feed rate relative to the fluid feed rate when the motor draws less than a preselected amount of power and reduces the pellet feed rate relative to the fluid feed rate when more than the preselected amount of the power is drawn.

The electrical control circuit includes first and second electric power lines 150 and 152. A watt transducer 154 is connected with the rotor motor 60 to monitor the amount of power (kilowatts) drawn thereby. A digital kilowatt meter 156 is connected with the watt transducer to provide a visual display of the instantaneous amount of power being drawn by the rotor motor. A calibration circuit 158 connects the watt transducer with a maximum kilowatt selector means 160. The maximum kilowatt selection means 160 has dials, or the like, on which an operator selects a maximum power which the rotor motor is to be allowed to draw. When the amount of power monitored by the watt transducer 154 is below the amount of power selected by the operator, the maximum power selector means 160 is in its activated state. When the amount of power monitored by the watt transducer meets or exceeds the selected maximum power, the maximum power selector means takes on its deactivated state. In its activated state, the maximum watt selector means 160 closes a normally open relay contact 162 and opens a normally closed relay contact 164. The normally open maximum power selector contact 162 controls the coil of a pilot relay 170. The maximum power pilot relay 170 has a normally open contact 172, shown in the lower portion of FIG. 7 which is used in controlling the vibratory feeding means 12. When the monitored power meets or exceeds the selected maximum power, the maximum power selector means 160 takes on its deactivated state opening the normally open contacts 162 and 172 and closing the normally closed contact 164. The maximum watt selector normally closed relay contact 164 controls an indicator lamp 166 for indicating that pellets are not being fed to the mixing tank.

To protect the pump motor 36, a pump motor overload control means is provided. A speed controller 180 controls the speed at which the pump motor 36 is operated. A speed selection potentiometer 182 allows the operator to select the speed at which the pump motor is to be operated and a speed indicator 184 provides a visual indication of the present pump motor speed. The speed controller produces a signal which varies in proportion to the amount of current being drawn by the pump motor 36 on a pair of terminals 186. A maximum current selector means 190 has dials, or the like, on which the operator selects a maximum current at which the pump motor is to be operated. The maximum current selector means 190 compares the selected maximum current with the current indicated on terminals 186. The maximum current selector means maintains the pump motor current below the maximum by controlling the pellet feeding means 12 to keep the slurry sufficiently fluid. When the current drawn by the pump motor 36 exceeds the maximum current, the maximum current selector means closes a normally closed contact 192 and opens a normally open contact 194. The normally closed contact 192 controls an indicator lamp 196 which indicates that the pump motor is running with less than the maximum current. The normally open maximum current selector contact 194 controls a maximum current pilot relay 200. The maximum current pilot relay 200 controls a normally open contact 202 for controlling the rate at which pellets are fed into the mixing tank. The normally open maximum power pilot relay contact 172 and the normally open maximum current pilot relay contact 202 are connected in series with the vibratory feeding means 12. A variable solid state device 204 controls the amount of power delivered to the vibratory feeder means motor 18 to control its frequency and amplitude of vibration.

FIGS. 8–13 illustrate another stator and rotor configuration in accordance with the present invention. In the embodiment of FIGS. 8–13 like elements with the embodiment of FIGS. 1-5 are denoted with the same reference numerals followed by a prime (').

Figure 8:
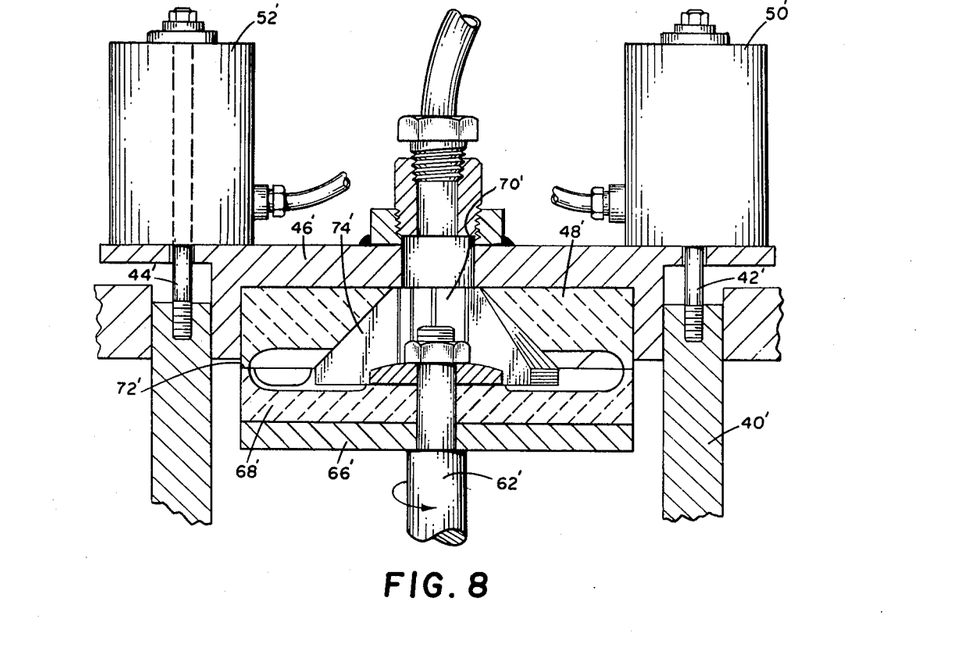
FIG. 8 is partial sectional view of an alternate embodiment of a comminuting system in accordance with the present invention.

Referring to FIG. 8, there is shown a mill housing 40' which is stationarily mounted. Extending upward from the mill housing are a plurality of upward extending posts, including posts 42' and 44'. The posts extend slidably through apertures in a stator support bracket 46' which holds a stator 48'. This enables the stator support bracket to move longitudinally on the posts but prohibits it from rotating. Connected to each of the posts is a plurality of fluid cylinders, including cylinders 50' and 52' for urging the stator support bracket toward the mill housing with a selected constant force. When comminuting vulcanized rubber in a grinding zone of about 40 to 45 square inches, a load of 2000 to 10,000 pounds has been found to produce satisfactory results for 10 inch diameter stators and rotors. A preferred load to be exerted by the cylinders is 3850 pounds of force for 10 inch diameter stators and rotors. Increases in the slurry pressure from the pump increase the preferred load. Decreases in the slurry pressure and decreases in the toughness of the comminuted material decrease the preferred load. The fluid, preferably hydraulic, cylinders continue to exert the same force as the stator moves longitudinally to compensate for wear on the stator and rotor abrasive surfaces. Because the stator and rotor are urged together by the fluid cylinders with a constant load but not held at a fixed spacing, the rotor and stator may undergo limited longitudinal movement with respect to each other as the pellets pass into the grinding zone. A mill shaft 62' rotates a plate 66' and a rotor 68' in mating cooperation with the stator. The rotor and stator define a slurry receiving region 70' and a grinding zone 72' therebetween. An impeller 74' is mounted on the rotor for rotation therewith.

Figures 9, 10:
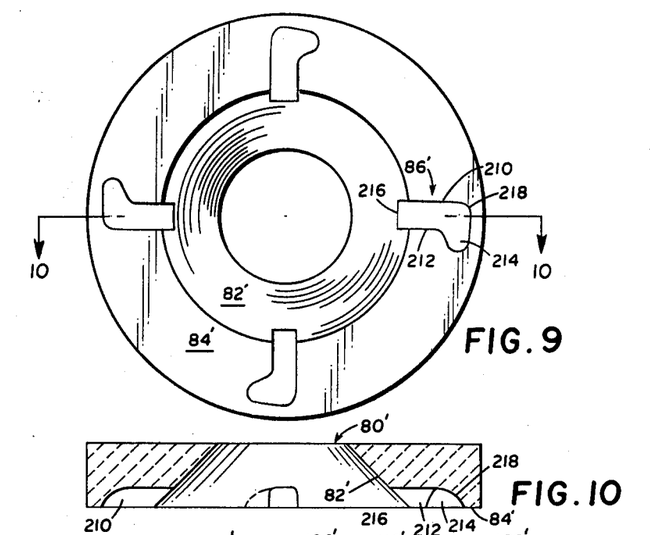
FIG. 9 is a bottom view of the stator of FIG. 8.
FIG. 10 is a sectional view through section 10—10 of FIG. 9.
Figures 11, 13:
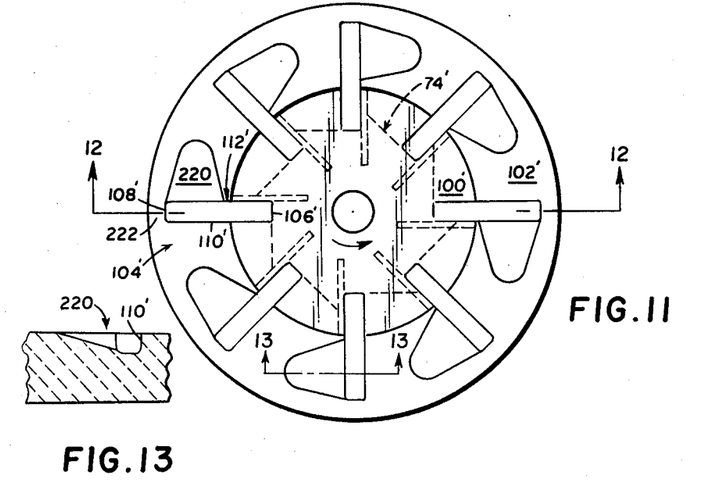
FIG. 11 is a top view of the rotor of FIG. 8.
FIG. 13 is a sectional view through section 13—13 of FIG. 11.
Figure 12:
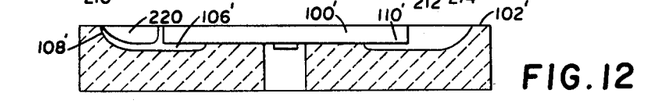
FIG. 12 is a sectional view through section 12—12 of the rotor of FIG. 11.

With continuing reference to FIG. 8 and further reference to FIGS. 9 and 10, the stator includes a plurality of stator recesses extending outward from the receiving region 70' into a peripheral abrasive surface 84'. Because each of the stator recesses is the same, a stator recess 86' is described in detail and it is to be appreciated that the description applies by analogy to the other stator recesses. The stator recess 86' has an upstream edge 210 which is first engaged as the rotor 68' rotates. The stator has a trailing edge 212 opposite to the upstream edge 210. An enlarged portion or relief area 214 which tapers generally between the full depth of the recess 86' to the level of the stator peripheral abrasive surface 84' extends downstream from the stator recess trailing edge 212. The stator recess 86' has an inside or receiving region end 216 in communication with the slurry receiving recess 86' and an outer or grinding zone end 218 in the grinding zone 72'.

With reference to FIGS. 8, 11, 12 and 13, the rotor 68' has a central receiving region surface 100' disposed adjacent the slurry receiving region 70' and a peripheral abrasive surface 102'. Extending outward from the slurry receiving region 70' into the grinding zone 72' are a plurality of generally P-shaped rotor recesses, in the preferred embodiment 8 P-shaped rotor recesses. Because each of the plurality of rotor recesses is substantially identical, a typical rotor recess 104' is described in detail and it is to be appreciated that the description applies by analogy to the other rotor recesses. The rotor recesses have an upstream edge 110' in the direction of rotation and a trailing edge 112' opposite the upstream edge. The trailing edge includes a downstream enlarged portion or relief area 220 in which a recess base wall tapers or cams generally from the lowest depth of the recess toward the rotor peripheral abrasive surface 102'. The rotor recess relief area has an arched perimeter, in the preferred embodiment. Each rotor recess further has a first or receiving region end 106' disposed in fluid communication with the slurry receiving recess and a second or outer end 108' separated by a small land 222 on the peripheral abrasive surface from the edge of the rotor.

As the rotor and impeller rotate, the pellets are impelled outward into the rotor recesses by the impeller. Centrifugal force from the rotation of the rotor accelerates the pellets with greater pressure toward the outer end 108' of the rotor recesses. As the rotor recesses come into alignment with the stator recesses, the stator recesses provide a return path for some of the fluid and pellets to the receiving region. Other pellets become wedged or cammed between the stator recess relief area 214 and either the rotor recess relief area or the rotor peripheral abrasive surface and other pellets become wedged between the rotor recess relief area 220 and the stator recess relief area 214 or the stator peripheral abrasive surface. With continued rotation, the pellets are stretched and wedged into the grinding zone and are comminuted as described above.

The invention has been described with reference to the preferred alternate embodiments. Obviously, alterations and modifications will occur to others upon reading and understanding the preceeding detailed description of the preferred and alternate embodiments. It is intended that the invention be construed as including all such alterations and modifications which come within the scope of the appended claims or the equivalents thereof.

Having thus described a preferred embodiment of our invention, we now claim our invention to be:

1. A comminuting apparatus comprising:
   a hopper for holding pellets to be comminuted;
   pellet feeding means for feeding the pellets from the hopper into a mixing tank at a selectable rate;
   a level controlled valve for feeding a fluid into a mixing tank such that the fluid level in the mixing tank is maintained substantially constant;
   agitator means for mixing the pellets and fluid in the mixing tank into a slurry;
   concentration control means for controlling the pellet feeding means such that the concentration of pellets in the slurry is maintained generally constant;
   pumping means for pumping the pellet and fluid slurry from the mixing tank to a slurry receiving region;
   a stator having (i) a receiving region surface for defining one surface of the slurry receiving region and (ii) a generally peripheral abrasive surface disposed peripherally around the stator receiving region surface;
   a rotor having (i) a receiving region surface for defining another surface of the slurry receiving region and (ii) a generally peripheral abrasive surface disposed peripherally around the rotor receiving region surface such that the slurry receiving region is defined generally between the rotor and stator receiving region surfaces and a grinding zone is defined between the rotor and stator peripheral abrasive surfaces; and
   rotating means for rotating the rotor relative to the stator.

2. An elastomeric material comminuting apparatus comprising:
- a hopper for holding pellets to be comminuted;
- pellet feeding means for feeding the pellets into a mixing tank at a selectable rate;
- fluid feeding means for feeding a fluid into a mixing tank;
- level control means for maintaining a substantially constant fluid level in the mixing tank;
- agitator means for mixing the pellets and fluid in the mixing tank into a slurry;
- pumping means for pumping the pellet and fluid slurry from the mixing tank to a slurry receiving region;
- a stator including (i) a receiving region surface for defining one surface of the slurry receiving region and (ii) a generally peripheral abrasive surface disposed peripherally around the stator receiving region surface;
- a rotor including (i) a receiving region surface for defining another surface of the slurry receiving region and (ii) a generally peripheral abrasive surface disposed peripherlally around the rotor receiving region surface, whereby the slurry receiving region is defined generally between the rotor and stator receiving region surfaces and a grinding zone is defined between the rotor and stator peripheral abrasive surfaces;
- rotating means for rotating the rotor relative to the stator; and,
- a concentration control means for controlling the concentration of pellets in the slurry, the concentration control means including a load sensing means for sensing the torsional load on the rotating means, the load sensing means being operatively connected with the pellet feeding means for adjusting the rate at which pellets are fed to the mixing tank such as to maintain a generally constant torsional load on the rotating means.

3. The apparatus as set forth in claim 2 wherein the fluid feeding means feeds fluid into the mixing tank at substantially the same rate that the pumping means pumps fluid to the receiving region, whereby the level of fluid in the mixing tank remains substantially constant.

4. The apparatus as set forth in claim 3 wherein the fluid feeding means includes a level controlled valve.

5. The apparatus as set forth in claim 2 wherein the rotating means is an electric motor and the load sensing means senses the amount of electrical power drawn by the electrical motor.

6. The apparatus as set forth in claim 5 wherein the pellet feeding means is a vibratory feeder.

7. The apparatus as set forth in claim 6 wherein the load sensing means enables and disables the vibratory feeder in response to the load exceeding and falling below a preselected load.

8. The apparatus as set forth in claim 2 wherein the pumping means is a progessing cavity positive displacement pump.

9. The apparatus as set forth in claim 8 wherein the positive displacement pump is connected with the slurry receiving region with an elongated feed pipe, the positive displacement pump pumping the pellet and fluid slurry through the feed pipe with sufficient velocity to maintain the pellets and fluids in a slurry.

10. The apparatus as set forth in claim 2 wherein the concentration control means includes means for sensing the torsional on the pumping means, the pump load sensing means being operatively connected with the pellet feeding means for adjusting the rate at which pellets are fed to the mixing tank as to maintain a generally constant torsional load on the pumping means.

11. The apparatus as set forth in claim 10 wherein the pumping means includes an electric motor and the pump load sensing means senses the amount of electrical power drawn by the electric motor.

12. The apparatus as set forth in claim 2 wherein the pumping means includes a pump and a variable speed motor.

13. The apparatus as set forth in claim 2 wherein the fluid feeding means is a water feeding means which feeds water into the mixing tank.

14. A comminuting apparatus comprising:
- an opposing stator and rotor with peripheral abrasive surfaces, said rotor revolving about an axis, said stator and rotor having opposing surfaces defining a receiving region therebetween for receiving a slurry of fluid and elastomeric pellets to be reduced in size, at least two recesses in said stator peripheral abrasive surface with an orientation in an outward flow direction from said axis, a plurality of outward oriented recesses defined in said rotor, said rotor recesses having a circumferentially sloping portion adjacent an outward end thereof;
- rotating means for rotating the rotor relative to the stator;
- means for mixing the elastomeric pellets and fluid into a slurry, the mixing means including:
  - a hopper for holding the elastomeric pellets to be comminuted;
  - pellet feeding means for feeding the elastomeric pellets into a mixing tank at a selectable rate;
  - fluid feeding means for feeding a fluid into a mixing tank;
  - level control means for maintaining a substantially constant fluid level in the mixing tank;
  - agitator means for mixing the elastomeric pellets and fluid in the mixing tank into a slurry;
  - a concentration control means for controlling the concentration of the elastomeric pellets in the slurry, the concentration control means including a load sensing means for sensing the torsional load on the rotating means, the load sensing means being operatively connected with the pellet feeding means for adjusting the rate at which pellets are fed to the mixing tank such as to maintain a generally constant torsional load on the rotating means;
- supplying means for supplying the fluid and pellet slurry to said receiving region;
- pressurizing means for increasing the pressure within said rotor recesses, the pressurizing means being disposed within the receiving region; and,
- urging means for urging at least one of said stator and rotor toward the other.

* * * * *